Patented May 12, 1925.

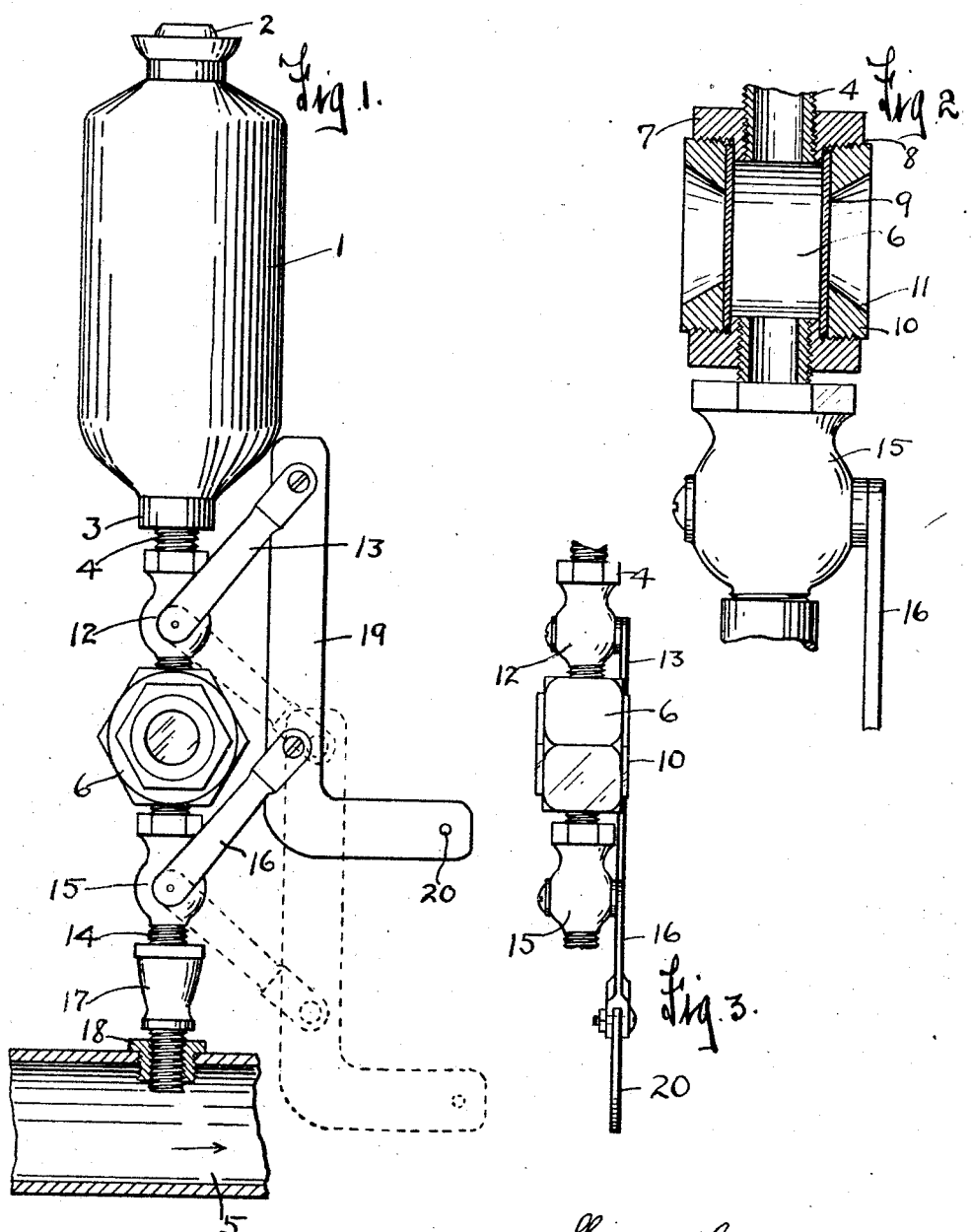

1,537,116

UNITED STATES PATENT OFFICE.

HARRY HOWLETT, OF HOUSTON, TEXAS.

GRAPHITE LUBRICATOR FOR STEAM LINES.

Application filed June 25, 1923. Serial No. 647,481.

*To all whom it may concern:*

Be it known that I, HARRY HOWLETT, a citizen of the United States, residing at Houston, Harris County, Texas, have invented a certain new and useful Improvement in Graphite Lubricators for Steam Lines, of which the following is a full, clear, and exact description, such as will enable others skilled in the art to which it appertains to make and use the same.

My invention relates to an improvement in lubricators for use on steam lines. It is intended for attachment to a line leading to a cylinder and has its particular value in lubricating the piston operating therein.

It is customary to feed the lubricant to pistons by directing it into a steam line leading directly to the cylinder. The lubricant ordinarily employed is lubricating oil or grease which has the objection that it is affected by the heat of the steam and is not properly delivered to the piston, where it is most needed.

It is an object of my invention to provide a lubricator whereby graphite in its dry or powdered state may be fed to the walls of the cylinder so as to properly lubricate the piston operating therein.

It is another object to provide a lubricator of this type whereby a predetermined charge of graphite may be delivered to the steam line when desired.

Other objects of the invention will become apparent in the description which follows.

Referring to the drawing herewith wherein a preferred embodiment of my invention is disclosed, Fig. 1 is a side elevation of my invention shown as attached to a steam line, said steam line being shown in longitudinal section. Fig. 2 is an enlarged detail showing the measuring chamber in central longitudinal section. Fig. 3 is a side elevation of the connection between the lubricant container and the steam line showing the position of the operating lever.

I have found that in the lubrication of pistons, especially in steam cylinders, graphite in its dry state is a much superior lubricant to oil or oil mixed with grahpite or other lubricating materials and in order to deliver powdered graphite directly to the cylinder and piston, I have devised the apparatus constituting the subject matter of this invention.

I place the powdered graphite, constituting the lubricant, within a container 1. This container may be of any approved form and I have shown one cylindrical in shape as shown at 1 having a constricted opening in the upper end adapted to be closed by a plug 2 threaded within said opening. The lower end of the container is reduced in diameter to form a neck 3 threaded internally for attachment to a pipe 4.

The steam line 5 is understood as leading directly into a steam cylinder having a reciprocating piston working therein. My container is connected to this steam line 5 by a pipe made up of sections and centrally within this pipe is a measuring chamber 6. This chamber as shown in Fig. 2 comprises a casting 7 having a central passage therethrough and having openings 8 on each side. in which openings are secured transparent plates 9 of glass or other similar material held in position and closing said opening by means of special nuts 10 which have outwardly flared openings therein so that the observer may note whether the central chamber is filled with lubricant.

Between the container 1 and the measuring chamber 6 is the pipe 4 previously mentioned within which is formed a valve chamber 12, a passage through which may be opened or closed by a valve operated by means of a lever 13. Said valve is adapted to be opened when the arm 13 is in an elevated position as shown in Fig. 1.

Connecting the measuring chamber with the steam line is a similar pipe 14 having therein a valve chamber 15. the valve in which is operated by the lever 16.

The pipe 14 is connected directly to the steam line by means of an intermediate coupling 17 threaded within a plug 18 in the pipe 5.

The levers 13 and 16 are adapted to be operated simultaneously by means of an arm 19, the lower end of which is bent laterally and provided with an opening 20 in which may be secured an operating rod or wire not shown.

My device is intended to be operated to introduce into the steam line a charge of graphite of a desired amount at such intervals as may be found suitable. When it is desired to introduce a predetermined amount of graphite into the cylinder, the operating arm 19 will be pushed upwardly in a position shown by full lines in Fig. 1. This will open the upper valve 12 and close the lower valve 15. A charge of graphite will then enter the measuring chamber from the container 1 and when the operator notes that the chamber has been properly filled, he will draw the operating arm downwardly into the dotted line position and thus close the upper valve 12 and open the lower valve 15. The passage of steam through the steam line will draw the charge of graphite with it, thus delivering it directly upon the operating piston.

The advantages of this type of construction lie in the fact that a charge of lubricant may be delivered when it is found necessary and by having the measuring chamber properly calibrated, the charge will be sufficient to thoroughly lubricate the operating piston. This operation may be repeated when necessary and complete and efficient lubrication thus obtained.

Having thus described my invention, what I claim as new and desire to protect by Letters Patent is:

1. A lubricator comprising a container for graphite, a steam line, a connecting pipe between said lubricator and said steam line, a measuring chamber in said connecting pipe, means to permit the filling of said chamber with a charge of graphite from said container and to thereafter close connection between said container and said chamber and to permit the discharge of said charge of graphite to said steam line.

2. A lubricator comprising a container for powdered graphite, a steam line for connection with a cylinder, a connecting pipe between said container and steam line, a measuring chamber in said pipe having transparent sides thereon, valves above and below said chamber, an operating lever connected with said valves adapted, when moved in one direction, to open the valve above said chamber and close the one below and to reverse this action on movement in the opposite direction.

In testimony whereof, I hereunto affix my signature, this the 21st day of June, A. D. 1923.

HARRY HOWLETT